(12) United States Patent
Legacy (10) Patent No.: US 9,027,098 B2
(45) Date of Patent: May 5, 2015

(54) SYSTEMS, METHODS, AND COMPUTER PROGRAM PRODUCTS FOR RECORDING SERVICE STATUS OF APPLICATIONS

(71) Applicant: Genband US LLC, Frisco, TX (US)

(72) Inventor: Allain Legacy, Ottawa (CA)

(73) Assignee: Genband US LLC, Frisco, TX (US)

( * ) Notice: Subject to any disclaimer, the term of this patent is extended or adjusted under 35 U.S.C. 154(b) by 62 days.

(21) Appl. No.: 13/803,695

(22) Filed: Mar. 14, 2013

(65) Prior Publication Data

US 2014/0281524 A1    Sep. 18, 2014

(51) Int. Cl.
*H04L 29/06* (2006.01)
*H04L 29/08* (2006.01)
*G06F 11/20* (2006.01)
*G06F 11/30* (2006.01)

(52) U.S. Cl.
CPC ............ *H04L 67/10* (2013.01); *G06F 11/2023* (2013.01); *G06F 11/30* (2013.01)

(58) Field of Classification Search
CPC ................................. H04L 63/20; H04L 67/10
USPC .......................................................... 713/168
See application file for complete search history.

(56) References Cited

U.S. PATENT DOCUMENTS

| | | | |
|---|---|---|---|
| 6,966,003 B1 * | 11/2005 | Joseph et al. | 726/14 |
| 7,797,566 B2 * | 9/2010 | Dror et al. | 714/4.11 |
| 8,166,527 B2 * | 4/2012 | Wen et al. | 726/6 |
| 8,614,941 B2 * | 12/2013 | Heitz | 370/218 |
| 2002/0026589 A1 * | 2/2002 | Fukasawa | 713/200 |
| 2004/0194153 A1 * | 9/2004 | Garg et al. | 725/151 |
| 2010/0162383 A1 * | 6/2010 | Linden et al. | 726/13 |
| 2010/0313023 A1 * | 12/2010 | Ren et al. | 713/169 |
| 2011/0066858 A1 * | 3/2011 | Cheng et al. | 713/171 |
| 2011/0113236 A1 * | 5/2011 | Chenard et al. | 713/154 |
| 2012/0204253 A1 * | 8/2012 | Sugimoto et al. | 726/12 |
| 2012/0304276 A1 | 11/2012 | Legacy et al. | |

\* cited by examiner

*Primary Examiner* — Harunur Rashid
*Assistant Examiner* — Bryan Wright
(74) *Attorney, Agent, or Firm* — Haynes and Boone, LLP (57) ABSTRACT

A method for use in a system with multiple processor-based devices, the method including: running a first application on a first processor-based device; maintaining a second application in a standby mode on the first processor-based device; and providing a service to each of the first and second applications on the first processor-based device by a service-providing application on the first processor-based device, wherein providing the service includes maintaining a record regarding service statuses of the first application and the second application in which the record stores a respective entry for each of the first and second applications to reflect an active service status for the first application and a standby service status of the second application.

20 Claims, 4 Drawing Sheets

SYSTEMS, METHODS, AND COMPUTER PROGRAM PRODUCTS FOR RECORDING SERVICE STATUS OF APPLICATIONS

TECHNICAL FIELD

The present description relates, in general, to computer systems with multiple, redundant processor-based devices and, more specifically, to techniques for tracking service status of various applications running on the devices.

BACKGROUND

IPsec is a protocol suite for securing IP communications by authenticating and encrypting each IP packet of a communication session. IPsec includes protocols for establishing mutual authentication between agents at the beginning of the session and negotiation of cryptographic keys to be used during the session. IPsec is an end-to-end security scheme operating in the Internet Protocol (IP) Layer of the Internet Protocol Suite. It can be used for protecting data flows between a pair of hosts (host-to-host), between a pair of security gateways (network-to-network), or between a security gateway and a host (network-to-host). Internet Key Exchange (IKEv1 or IKEv2) is a protocol used to set up a security association (SA) in the IPsec protocol suite. IKE uses a Diffie-Hellman key exchange to set up a shared session secret, from which cryptographic keys may be derived. Public key techniques or, alternatively, a pre-shared key, may be used to mutually authenticate the communicating parties.

In a typical system, an IKE Key Manager (KM) is co-located on the same device as each of its dependent applications. This is also true of a typical high-availability (HA) system where the active KM and its active dependent applications are co-located on a same device. In the event of a device fault or application fault the KM and its dependent applications are re-assigned to a backup device and the previously active device is disabled, tested, and returned to service at a later time.

In a high-availability system, implementing an IPsec solution can be a complex task. Several data items are synchronized across two or more devices. Some data, such as application configuration data, is static in nature and is usually only distributed once to all devices and updated when modified by user request. Static data is relatively straightforward to synchronize across redundant devices. Other data is dynamic and usually involves more complex processing and interactions to synchronize in conventional systems.

Dynamic data is data that changes without direct user manipulation either on a per-packet basis or per-event basis. IPsec Security Association (SA) SPI values, sequence numbers, and key values are examples of dynamic IPsec data. A precondition to setting up an IPsec SA is the establishment of an Internet Key Exchange (IKE) SA. The generation of an IKE SA is triggered by a packet, sent by an application, which matches an IPsec Security Policy (SP) and which does not have a corresponding IPsec SA instance. The absence of an IPsec SA is the trigger to the KM to establish a new IKE SA if one does not already exist. Once the IKE SA is established it remains in the KM SA Database (SADB) until its configured lifetime has expired; typically in the order of days or weeks. Its purpose is to secure communications between the two nodes for the purpose of negotiating replacement IPsec SA instances as those instances expire at the end of their configured lifetime; typically in the order of hours or days.

Secondary to the task of negotiating replacement IPsec SA instances, the IKE SA is used in conventional systems to monitor the presence of the IKE SA at the far-end device. In this case, the absence of replies from the far-end device is considered a fault event and the child IPsec SA instances are deleted and secure communication is halted until a new set of IKE and IPsec SA instances can be negotiated.

As IKE SA instances are negotiated or refreshed their dynamic data is synchronized across the redundant devices. This task is usually straightforward when the KM is operated in a scenario in which the applications on a given device are either all active or all in standby mode. Data flows from one device to multiple devices, and since there is only a single master KM, complexity is greatly reduced.

There is currently no solution to efficiently provide high availability IKE SA instances in systems that do not conform to an all-active or all-standby per device model.

BRIEF DESCRIPTION OF THE DRAWINGS

The present disclosure is best understood from the following detailed description when read with the accompanying figures.

SUMMARY

According to one embodiment, a method for use in a system with multiple processor-based devices, the method including: running a first application on a first processor-based device; maintaining a second application in a standby mode on the first processor-based device; and providing a service to each of the first and second applications on the first processor-based device by a service-providing application on the first processor-based device, wherein providing the service includes maintaining a record regarding service statuses of the first application and the second application in which the record stores a respective entry for each of the first and second applications to reflect an active service status for the first application and a standby service status of the second application.

According to another embodiment, a system includes a first processor-based device; a service-providing module running on the first processor-based device, the service-providing module keeping application-level records of service statuses; a first application running on the first processor-based device and receiving a service from the service-providing module; and a second application maintained on the first processor-based device, the second application being in an inactive mode, wherein the service-providing module keeps a record for the first application showing an active service status and keeps a record of the second application showing an inactive service status.

According to another embodiment, a computer program product having a computer readable medium tangibly recording computer program logic for providing a high-availability (HA) service to multiple applications at a device that is part of a cluster of redundant devices, the computer program product including: code to run a first application on the device, the first application having an active status and corresponding to an instance of the HA service; code to maintain a second application in an inactive status at the device; and code to maintain a record of an HA activity state for each of the first and second applications, wherein a first entry in the record shows an active HA activity state corresponding to the instance of the HA service, and wherein a second entry in the record shows an inactive HA activity state for the HA service for the second application.

According to another embodiment, a method for providing security in a cluster of redundant processor-based devices, the method including: hosting a plurality of applications on a first processor-based device of the cluster, wherein a first application of the plurality is in an active state, and in which a second application of the plurality is in an inactive state; and providing a secure communications service to the plurality of applications by a security service management module at the first processor-based device; wherein providing the secure communications service includes recording a secure communications service status for the plurality of applications on an application-by-application basis, wherein a secure communications service status for the first application is active, and wherein the secure communications service status for the second application is inactive.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments include systems, methods, and computer program products providing an effective technique to provide services across multiple processor-based devices wherein each of the processor-based devices may have some applications that are active and some applications that are maintained in a standby mode. In one example, there are multiple blade computers, where the blade computers are configured in a high availability cluster. Each of the blade computers hosts multiple applications, and the processing burden is spread among the blade computers by distributing active ones of the applications among the blade computers. Thus, a first application may be active on a first one of the blade computers but is in standby mode on the other blade computers. If the first application has a fault, operation of the first application is stopped on the first blade computer, and another one of the blade computers runs the first application in active mode using its most up-to-date state information. Similarly, a second one of the applications is active on a second blade computer and in standby mode on the other blade computers.

Each of the blade computers includes an IKE KM instance running thereon. At each blade computer, its IKE KM instance keeps a Security Association Database (SADB) that tracks the SAs for each of the applications. At the first blade computer, its SADB notes that the SA instance for the first application is active and notes that the SA instance for the second application is in standby mode. Moving to the second blade computer, its IKE KM instance also has an SADB, and its SADB shows that the SA instance for the first application is in standby mode, whereas the SA instance of the second application is active. In other words, in this example an IKE KM on a given computing device treats the various SA instances according to an application state on that particular computing device. Each computing device may have a different make up of active/standby application states, and each respective IKE KM treats the application SAs according to the application states on its given device. By contrast, conventional systems include all applications on a device as either active or standby; in a device with all active applications the KM is active and there is no concept of application-by-application status whether in the SADB or otherwise.

Continuing with the example, the first blade computer has a first application that is active and a second application that is in standby mode. Similarly, the second blade computer has a second application that is active, and the first application is in standby mode. SA data for the active applications is dynamic and will change over time. Thus, the IKE KM on the first blade computer sends SA data updates to the IKE KM on the second computer. The IKE KM on the second computer updates its data regarding the SA of the first application. Similarly, the IKE KM on the second blade computer sends SA data updates to the IKE KM on the first blade computer. In this manner, each IKE KM instance has up-to-date SA data for each application, whether the application is active or inactive on that particular blade computer. If the system switches to an active status of the first application on the second blade computer, the IKE instance on the second blade computer has relevant information to apply the appropriate SAs for the first application, rather than having to set up new SAs.

It is understood that the scope of embodiments is not limited to any type of computer. For instance, while the example above refers to blade computers, various embodiments may include other types of processor-based devices. Also, while the example above refers to IKE, it is understood that the concepts apply to other services in a computer system having redundant processor-based devices.

Figure 1:
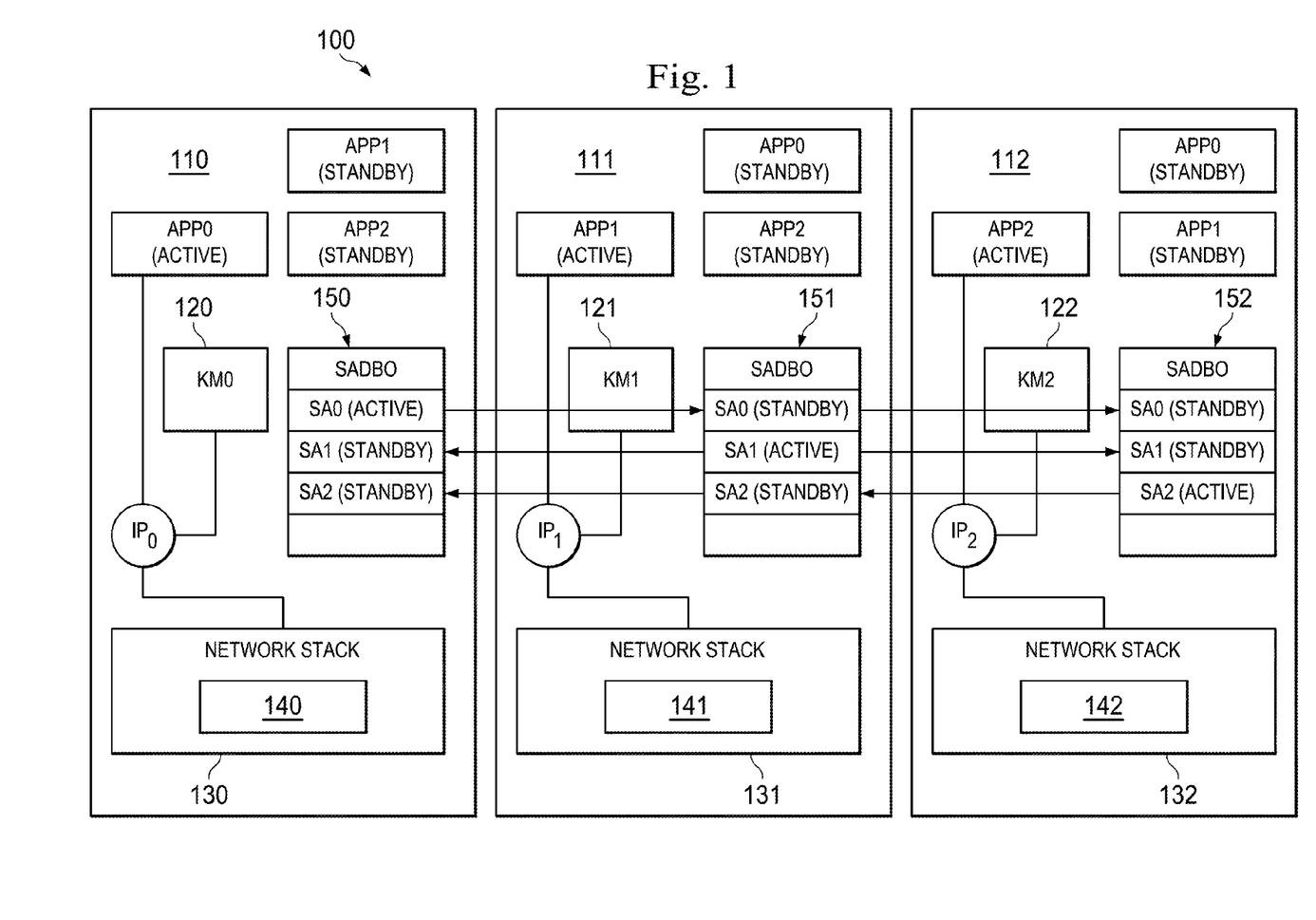
FIG. 1 is an illustration of an example computing system adapted according to one embodiment.

FIG. 1 is an illustration of an example computing system 100 adapted according to one embodiment. System 100 includes three devices 110-112 shown as block diagrams including the processes in each of the devices 110-112. Devices 110-112 are processor-based computing devices and may be used in any of a variety of settings. In one example, devices 110-112 are used in telecommunication, and the applications thereon facilitate the transmission of data over one or more networks, such as by providing Voice Over Internet (VOIP) service or a Virtual Private Network (VPN).

The example of FIG. 1 shows three devices 110-112, and it is understood that the scope of embodiments is not limited to any particular number of devices; nor is the scope of embodiments limited to any particular number of applications in an active or inactive state on devices 110-112. Any appropriate number of devices and applications can be adapted for use in various embodiments.

In this example, devices 110-112 each perform their own IPsec processing. For example, device 100 includes IKE daemon/process 120, which communicates with networking stack 130. IKE daemon/process 120 includes a KM main processing engine that has a KM instance, KM0, running thereon. In this example, networking stack 130 includes an IPsec processing module 140 for performing IPsec processing. IKE daemon/process 120 on device 110 communicates with a similar IKE daemon/process at another device (also referred to as a "far-end node", not shown) on the other side of a gateway (not shown) in order to perform initial IPsec security association (SA) setup. In fact, each IKE daemon/process 120-122 may communicate with various far-end nodes (not shown) to set up SAs for each of the active applications running thereon.

Devices 111 and 112 are similar to device 110, described above. For instance, device 111 includes IKE daemon/process 121, network stack 131, and IPsec processing module 141. Device 112 includes IKE daemon/process 122, network stack 132, and IPsec processing module 142. The various components of devices 111 and 112 operate substantially similarly to the components of device 110, where IKE daemons/processes 121 and 122 both set up SAs for the applications that are active on each respective device 111, 112.

Devices 110-112 are configured in a High Availability (HA) cluster. In one example, a fault on one device can be ameliorated by starting an active process on another device to compensate for the fault. Furthermore, devices 110-112 are configured so as to balance the processing load between them. In this example, APP0 is active on device 110, APP1 is active on device 111, and APP2 is active on device 112, thereby balancing the load of the three applications among devices 110-112. While the present example shows only one active application on a given device, the scope of embodiments is not so limited. Rather, various embodiments may include any appropriate number of active and standby applications on a given device, and various embodiments may also distribute active and standby states for the applications in any appropriate manner.

Also, for each device 110, 111, or 112 the other applications in system 100 are in an inactive state—"standby" mode. Thus, APP1 and APP2 are in standby mode on device 110, APP0 and APP2 are in standby mode on device 111, and APP0 and APP1 are in standby mode on device 112. In one example, if APP0 has a fault on device 110, either one of devices 111 or 112 can activate APP0 by applying appropriate state information and running APP0 thereon.

In the example of FIG. 1, the KM implementation includes recording an HA activity state for each IKE SA for each individual application at each device 110-112. A particular recorded HA activity state mirrors the HA activity state of the application that is associated with an IKE SA. As an HA activity state of an application changes, the recorded state changes as well.

Each KM instance (KM0, KM1, or KM2) maintains a list of IKE SA instances in an internal SA Database (SADB) 150, 151, or 152. Some such instances have an HA activity state of "active" and some are "standby". For example, SADB 150 includes an entry for an SA associated with APP0 (SA0), and the status is shown as active. SAs for APP1 and APP2 (SA1 and SA2, respectively) each have an entry showing an inactive standby status. Thus, in the present embodiment, each KM instance treats SA instances according to their individual HA activity state. By contrast, in conventional implementations, the applications on a given device were assumed to be co-located with a single KM instance, and all SA instances were considered either "active" or "standby" by extension of the KM HA activity state.

As noted above, on device 110 APP0 is active and APP1 and APP2 are in standby mode. Such states are recorded by KM0 in SADB 150. Similarly, SADB 151 shows APP1 as active and all others as in standby mode, and SADB 152 shows APP2 as active and all others in standby mode.

For each device 110, 111, or 112, its respective KM main processing engine treats standby SA instances differently from active SA instances. As shown in FIG. 1, the KM instances KM0, KM1, and KM2 are inter-connected and share their IKE SADB information via a synchronization mechanism. An example synchronization mechanism includes one built on the Transparent Inter-Process Communication (TIPC) cluster communication protocol, though other protocols may be used as appropriate. Each KM instance is responsible for sending configuration information of its active SA instances to the other KM instances; and in turn each KM instance accepts SA instance configuration information from other KM instances.

At a given KM instance, configuration information for SA instances received from other KM instances are assumed to have a standby HA activity state until a later time when (and if) the associated application becomes active on the same device as the given KM instance. Furthermore, configuration information for SA instances received from other KM instances are assumed to be finalized SA instances; meaning that they are not in an intermediate stage of negotiation.

In this example, SA instances that have been fully negotiated with a far-end node may be synchronized to peer KM instances; incomplete SA instances are not. An SA instance in an intermediate state when its associated application changes HA activity state may be purged and further messages are not exchanged with the far-end node from this KM instance. The subsequent message exchanges related to that particular application may be carried out by the KM instance on the given device being assigned the active application instance.

In some examples, a KM instance may request a full SADB copy from a peer KM instance to recover from a process restart. Such feature may allow a KM process to be restarted due to a fault or as a result of a manual action such as patching while minimizing service interruption.

In the present example, KM instance KM0, KM1, and KM2 still perform many of the functions of a conventional KM instance. For example, KM instances KM0, KM1, and KM 2 are responsible for negotiating new or replacement IKE SA instances, negotiating new or replacement child IPsec SA instances, retransmitting individual exchange messages in the event of timeouts, responding to periodic informational messages received from the far-end, and monitoring the health/availability of the far-end devices with its own informational messages. However, in the example of FIG. 1, the roles of the KM instances KM0, KM1, and KM2 differ from those conventional systems in that a given KM instances does not perform the above-listed tasks on IKE SA instances with a standby HA activity in its respective SADB. In this embodiment, inactive instances are usually ignored by a respective KM main processing engine other than 1) being updated as a result of synchronization messages received from peer KM instances, and 2) instantiating an SA instance when a corresponding application becomes active on the respective device.

Thus, in the embodiment of FIG. 1, IKE daemon/process 120 maintains SADB 150, which records an active state for SA0, which corresponds to APP0. SADB 150 also records an inactive state for SA1 and SA2, corresponding to APP1 and APP2, respectively. KM0 sends configuration information regarding SA0 to KM1 and KM2, thereby allowing KM1 and KM2 to keep up-to-date state information in case APP0 should be activated on device 111 or 112. In other words, configuration information for a given SA allows that SA to be instantiated on another device. Similarly, KM0 receives SA configuration information regarding SA1 from KM1 and configuration information regarding SA2 from KM2. KM0 stores the configuration information for SA1 and SA2 either in SADB or in another appropriate storage place that can be accessed upon discerning that APP1 or APP2 has been activated on device 110. KM1 and KM2 perform similarly to the described functionality of KM0 above.

Figure 2:
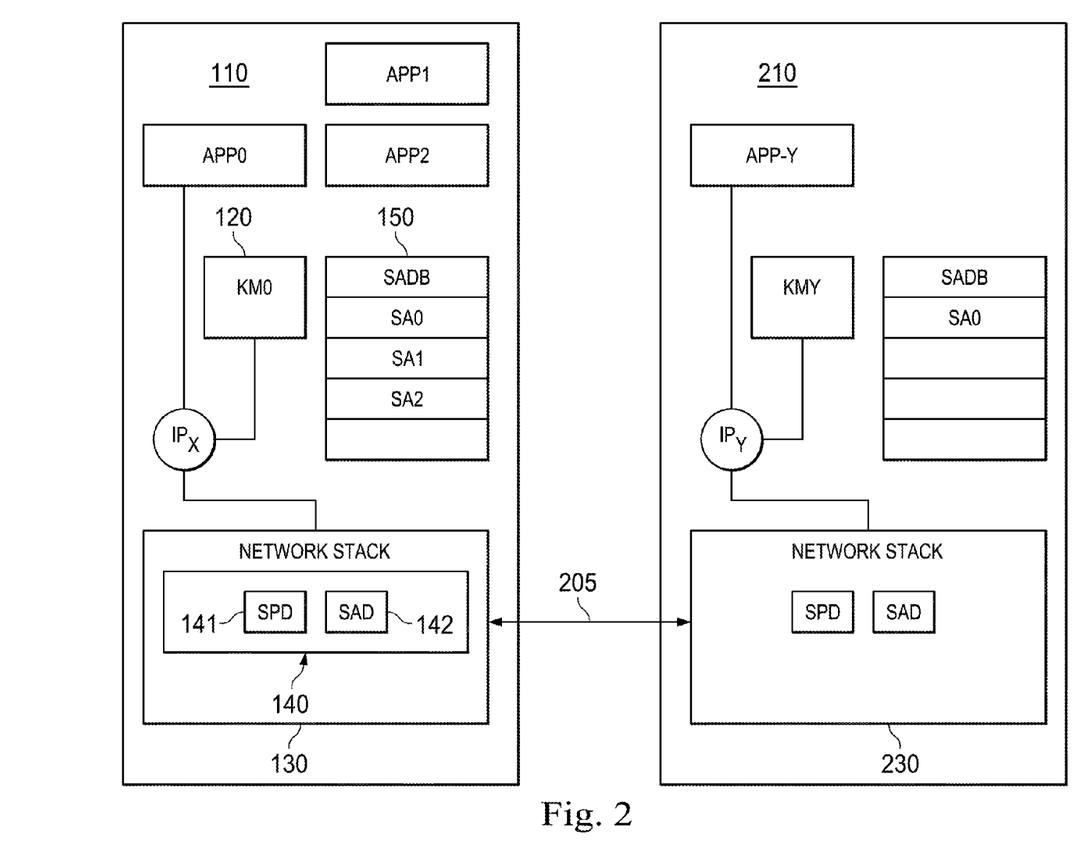
FIG. 2 is an illustration of an example system, adapted according to one embodiment.

FIG. 2 is an illustration of exemplary system 200, adapted according to one embodiment. System 200 shows a relationship between device 110 and far-end node 210 in one example. Devices 111, 112, which are in an HA cluster with device 110, are omitted from FIG. 2 for simplicity of illustration.

IPsec processing module 140 is shown having Security Policy Database (SPD) 141 and SA Database (SAD) 142. SAD 142 stores information regarding the active SAs in the device (in this example, information about the SA0). SPD 141 stores IPsec policies. IPsec policies maintained in SPD 141 may define which traffic is to be protected and how it is to be protected. Device 110 determines which policy is appropriate for a packet based on various selectors in SPD 141. Exemplary selectors include: source and destination IP addresses, transport layer protocols (e.g., SCTP, TCP or UDP), or source and destination ports. SPD 141 may also indicate which policy is to be used for a particular packet. As packets are sent and received at device 110, the packets are processed by IPsec processing module 140 according to the policies and the SAs. Device 210 and network stack 230 operate in a similar manner.

Devices 110 and 210 are in communication via Internet Protocol (IP) link 205. In this example, APP0 is communicating over link 205 with APP-y on device 210 according to an IPsec SA that been set up by network stacks 130 and 230.

In one example, if a fault occurs at APP0 on device 110, the HA cluster to which device 110 belongs may deactivate APP0 on device 110 and activate APP0 and SA0 on either device 111 or 112 (FIG. 1). APP0 in this example would keep its IP address and be activated in the same or a similar state as it was in at device 110. APP0 would then continue to communicate with APP-y using the same IPsec SA, albeit from a different processor-based device. Thus, in some embodiments, the HA configuration of device 110 may be transparent to device 210 and APP-y.

FIG. 2 is shown as an example only, and other hardware and software arrangements are possible. Though not shown in FIG. 2, it is understood that the communication between devices 110 and 210 may traverse a gateway (not shown) and/or one or more network routers (also not shown).

Figure 3:
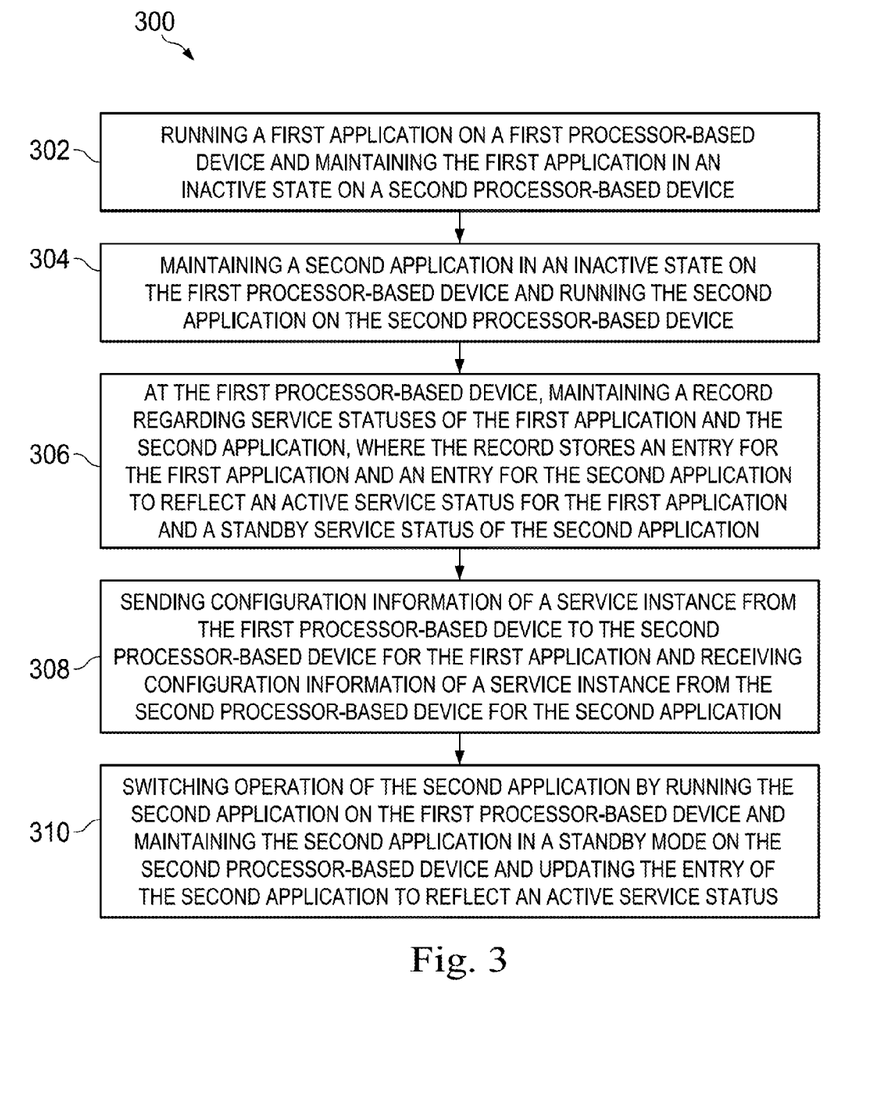
FIG. 3 is an illustration of an example method adapted according to one embodiment.

FIG. 3 is an illustration of exemplary method 300 adapted according to one embodiment. Method 300 may be performed by a system, such as system 100 of FIG. 1, which includes multiple processor-based devices that have a common group of applications in active and inactive states at the processor-based devices. Method 300 addresses actions at two processor-based devices regarding two applications for simplicity of illustration, through various embodiments are not limited by number of processor-based devices or by a number of applications at the processor-based devices.

Method 300 provides an example process in which a service-providing application, such as a KM, may track service statuses of applications at an application-by-application level rather than at a device level. Method 300 facilitates high availability concepts and load balancing concepts by allowing a given processor-based device to have some applications that are active and others that are inactive while providing device-level services to the different applications.

In action 302 the system runs a first application on a first processor-based device and maintains the first application in an inactive state on a second processor-based device. Thus, the first application has an active status at the first processor-based device and an inactive status at the second processor-based device.

In action 304, the system maintains a second application in an inactive state on the first processor-based device and runs the second application on the second processor-based device. Thus, the second application is in an inactive state at the first processor-based device and is in an active state at the second processor-based device. Taken together, actions 302 and 304 arise in a scenario in which two or more applications are distributed among a multitude of computers. In this example, each application runs on one computer and is in standby mode on a second computer in order to distribute load among the computers while also allowing for a rapid switch-over from one computer to another for a given application according to HA principles.

In action 306, the first processor-based device maintains a record regarding a service status of the first application and a service status of the second application. The record maintains an entry for the first application and an entry for the second application. The entry for the first application reflects an active service status, and the entry for the second application reflects a standby service status.

In the example of FIG. 1, the service that is provided to the applications is IKE services, and the service status of the applications is the status of the SAs, where each of the SAs correspond to a respective application. An application that is active also has an SA with an active status, and an application that has a standby status also has an SA with a standby status. In such an example, action 306 may be performed by a KM at the first processor-based device. Various embodiments include other types of services offered to applications within a cluster of computers.

While not shown in FIG. 2, in some embodiments the second processor-based device maintains a record that reflects the service statuses of the applications. In such an embodiment, the record at the second processor-based device may have an entry showing an inactive service status for the first application and an active service status for the second application.

In action 308, the first processor-based device sends configuration information of a service instance for the first application to the second application. The first processor-based device also receives configuration information of a service instance of the second application from the second processor-based devices.

In the example of FIG. 1, device 110 sends SA configuration information for SA0 to the other devices 111 and 112. Device 110 also receives SA configuration information for the SAs that correspond to the inactive applications—SA1 and SA2. The configuration information includes state information that allows a given KM to instantiate an IKE SA from an inactive SA. Thus, the configuration information for SA0 that is received by device 111 allows KM1 to instantiate an IKE SA according to SA0, if needed, to provide communication between APP0 and a far-end node.

Returning to FIG. 3, in action 310, the system switches operation of the second application by running the second application on the first processor-based device and maintaining the second application in an inactive state at the second processor-based device. The system also updates the entry for the second application at the first processor-based device to reflect an active service status.

In the example of FIG. 1, a fault at APP1 in device 111 may be handled by running APP1 at device 110, and changing APP1 to inactive standby status at device 111. In furtherance of this action, KM0 changes a status in SADB 150 to reflect that SA1 is active. Similarly, KM1 may change a status in SADB 151 to reflect that SA1 is inactive. In some examples, KM0 may become aware that APP1 is running at device 110 by noticing that an IP address of APP1 is in use at network stack module 130.

Some embodiments include a process that controls the movement of an application from one device to another. In one example, a system includes an AMF (application management framework) that is responsible for the life-cycle of the application processes running in the system. The AMF decides whether an application should be active or standby based on various factors. Depending on the configuration of the application, if an application has a fault or restarts then the AMF may decide to set its state to standby and make another instantiation of that application active on some other processor. In some examples, the AMF is a process running on the system in the same context as the IKE process and the application process.

Action 310 may also include actively performing the service for the second application at the first processor-based device. In one example, KM0 instantiates SA1 at device 110 so that APP1 can communicate with a far-end node.

Various embodiments may add, omit, rearrange, or modify the actions of method 300. For instance, some embodiments include additional processor-based devices and additional applications. Furthermore, some embodiments may continually perform method 300, switching active/inactive status of the applications among the processor-based devices to provide high availability and load balancing over an extended period of time.

Various embodiments may provide one or more advantages over conventional systems that have all applications be either active or inactive for an given device. The ability to decouple the active role assignment of applications from the active role assignment of the KM, and other applications may reduce the complexity of implementing and maintaining large systems. For example, in some embodiments application instances do not require co-location with other applications, thereby allowing applications to be developed and tested in isolation.

Additionally, third-party applications may be integrated with few, or no, modifications with a system that implements some embodiments. For instance, in some embodiments, the KM listens for IP address notifications coming from the networking stack. Such events exist in the system anyway and so may only involve a change to the KM without further changes to the AMF or to the applications themselves. This isolates the change to one component (the KM), reduces system complexity, reduces opportunities for failures, and reduces the time and cost required to integrate new applications in to the system.

Some embodiments may allow a system designer to reduce system complexity and distribute applications throughout a redundant set of devices, since active applications can be distributed to different devices. Such feature may increase reliability by reducing the impact of a single device failure. For example, if two applications are active on the same device and that device fails, there is a 100% system impact while both applications are relocated to a backup device. But if one application was on device A while the other was on device B then there is only a 50% system impact if either A or B fails.

Furthermore, as a cost of ownership reduction measure, various embodiments may allow a system designer to collapse multiple smaller systems on to a single set of redundant devices by running multiple independent applications on the same set of devices. Active application roles can be distributed across different devices in a redundant set. The active role distribution is transparent to applications; thus simplifying integration of third-party application and/or legacy systems. In some embodiments, applications need not share the same IP address and need not be co-located on the same device at the same time.

In general, overall system performance can be increased by distributing applications over multiple devices. During an IKE SA negotiation, one stage in particular is CPU-intensive: the Diffie-Hellman key exchange (DH). Without hardware acceleration, the DH stage of an IKE negotiation can consume a substantial share of CPU resources if multiple IKE SA instances are negotiated in parallel. In a large system, this is not uncommon. By distributing applications across multiple devices, the DH CPU load is also distributed across multiple devices thereby increasing overall system performance and responsiveness.

When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

Figure 4:
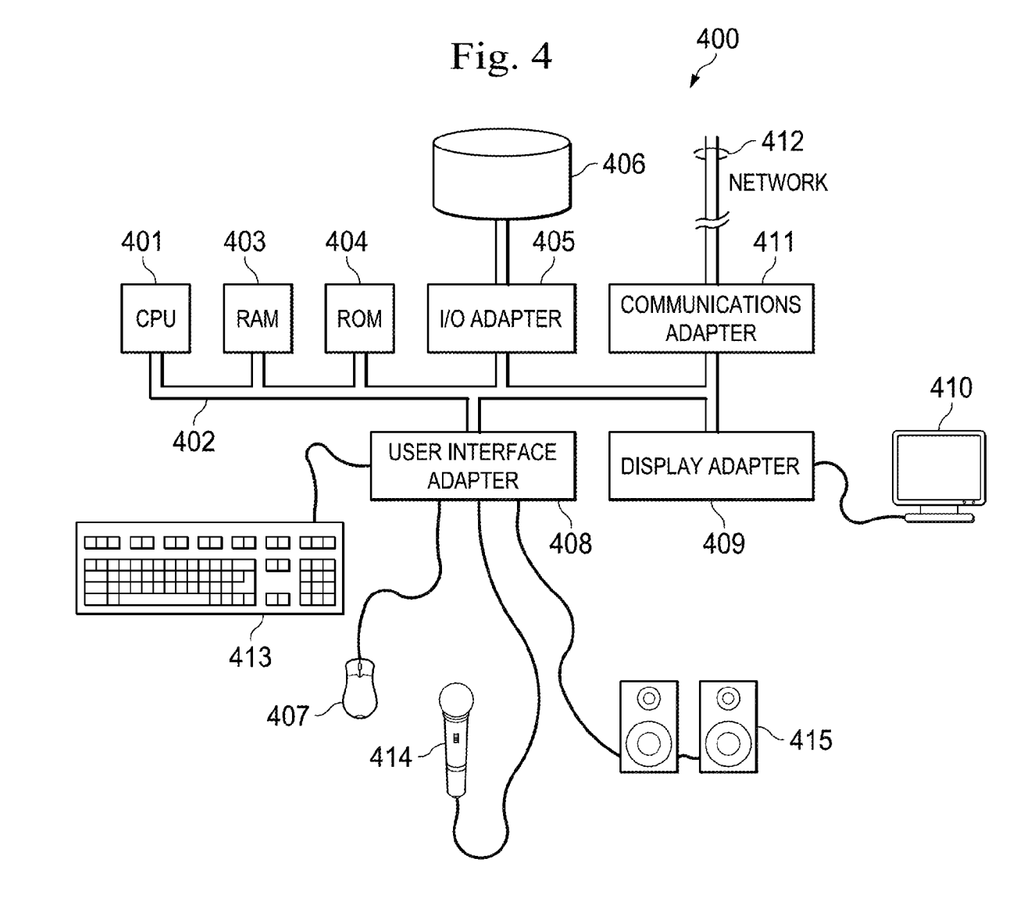
FIG. 4 illustrates an example computer system adapted according to one embodiment.

FIG. 4 illustrates an example computer system 400 adapted according to one embodiment of the present disclosure. That is, computer system 400 comprises an example system on which embodiments of the present disclosure may be implemented (such as a blade computer in a rack, a desktop computer, a laptop computer, a tablet computer, and/or the like). For instance, each processor-based device 110-112 of FIG. 1 may be represented in general by a computer similar to computer system 400.

Central processing unit (CPU) 401 is coupled to system bus 402. CPU 401 may be any general purpose or specialized purpose CPU. However, the present disclosure is not restricted by the architecture of CPU 401 as long as CPU 401 supports the inventive operations as described herein. CPU 401 may execute the various logical instructions according to embodiments of the present disclosure. For example, one or more CPUs, such as CPU 401, may execute machine-level instructions according to the exemplary operational flows described above in conjunction with FIG. 3.

Computer system 400 also preferably includes random access memory (RAM) 403, which may be SRAM, DRAM, SDRAM, or the like. Computer system 400 preferably includes read-only memory (ROM) 404 which may be PROM, EPROM, EEPROM, or the like. RAM 403 and ROM 404 hold user and system data and programs.

Computer system 400 also preferably includes input/output (I/O) adapter 405, communications adapter 411, user interface adapter 408, and display adapter 409. I/O adapter 405, user interface adapter 408, and/or communications adapter 411 may, in certain embodiments, enable an administrator to interact with computer system 400 in order to input information to install new applications and keep the system running.

I/O adapter 405 preferably connects to storage device(s) 406, such as one or more of hard drive, compact disc (CD) drive, solid state drive, etc. to computer system 400. The storage devices may be utilized when system memory RAM 403 is insufficient for the memory requirements associated with storing data. Communications adapter 411 is preferably adapted to couple computer system 400 to communication link 412 (e.g., the Internet, a LAN, a cellular network, etc.). User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410 to, for example, when interacting with an administrator.

In accordance with embodiments of the present disclosure, computer system 400 performs specific operations by CPU 401 executing one or more sequences of one or more instructions contained in system memory component 403. Such instructions may be read into system memory component 403 from another computer readable medium, such as ROM 404 or drive 406. In other embodiments, hard-wired circuitry may be used in place of (or in combination with) software instructions to implement the present disclosure.

Logic may be encoded in a computer readable, non-transitory medium. Such a medium may take many forms, including but not limited to, non-volatile media and volatile media. In various implementations, non-volatile media includes optical or magnetic disks, such as disk or solid-state drive component 406, and volatile media includes dynamic memory, such as system memory component 403. CPU 401 reads application code from the readable medium and executes the code to provide the described functionality.

In various embodiments of the present disclosure, execution of instruction sequences to practice the present disclosure may be performed by computer system 400. In various other embodiments of the present disclosure, a plurality of computer systems (not shown) coupled by communication link 412 (e.g., a communications network, such as a LAN, WLAN, PTSN, and/or various other wired or wireless networks, including telecommunications, mobile, and cellular phone networks) may perform instruction sequences to practice the present disclosure in coordination with one another.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for negotiating security statuses in a system with multiple processor-based devices, the method comprising:
   running a first application on a first processor-based device;
   maintaining a second application in a standby mode on the first processor-based device;
   providing a service to each of the first and second applications on the first processor-based device by a first service-providing application on the first processor-based device; and
   maintaining, at the first service-providing application of the first processor-based device, a record for the first application and second application, wherein the record stores a security service status related to the first application and a security service status related to the second application, the record reflecting an active security status for the first application and a standby security status for the second application;
   receiving service configuration information from a second processor-based device regarding the second application at the second processor-based device, wherein the second application has an active security status on the second processor-based device; and
   updating service configuration information for the second application on the first processor-based device based on the receiving.

2. The method of claim 1 further comprising operating in which the first and second processor-based devices in a High Availability (HA) cluster.

3. The method of claim 1 in which the service-providing application comprises a key manager for an encryption protocol, further in which each of the respective entries in the record stores information regarding a respective security association of each of the first and second applications.

4. The method of claim 1 further comprising:
   maintaining the first application in a standby mode in the second processor-based device; and
   running the second application on the second processor-based device, the second processor-based device being in communication with the first processor-based device.

5. The method of claim 4 further comprising:
   switching operation of the second application by running the second application on the first processor-based device and maintaining the second application in a standby mode on the second processor-based device;
   switching operation of the first application by maintaining the first application in standby mode on the first processor-based device; and
   updating the entry of the second application to reflect an active service status and the entry of the first application to reflect an inactive service status.

6. A system comprising:
   a first processor-based device;
   a service-providing application running on the first processor-based device, the service-providing application keeping application-level records of service statuses;
   a first application running on the first processor-based device and receiving a service from the service-providing application;
   a second application maintained on the first processor-based device, the second application being in an inactive mode, wherein the service-providing application keeps a record of the first application showing an active service status and keeps a record of the second application showing an inactive service status; and
   a communications interface operable to receive service configuration information from a second processor-based device regarding the second application at the second processor-based device,
   wherein the second application has an active security status on the second processor-based device and wherein the service-providing application is operable to update service configuration information for the second application on the first processor-based device based on the received service configuration information.

7. The system of claim 6, wherein the second processor-based device includes an instance of the service-providing application, the second application being active on the second processor-based device and the first application being inactive on the second processor-based device, the instance of the service-providing application keeping a second record at the second processor-based device to indicate an inactive service status of the first application and an active service status of the second application.

8. The system of claim 7 in which the service-providing application on the first processor-based device sends security configuration information about the first application to a second service-providing application on the second processor-based device.

9. The system of claim 6 in which the first processor-based device comprises a server in a telecommunications system, the server being in a High Availability (HA) cluster with the second processor-based device hosting the first and second applications.

10. The system of claim 6 in which the service from the service providing application comprises Internet Key Exchange (IKE) Security Association (SA) setup, and in which the service providing application comprises a key manager.

11. A computer program product having a non-transitory computer readable medium tangibly recording computer program logic for providing a high-availability (HA) service to multiple applications at a device that is part of a cluster of redundant devices, the computer program product comprising:
   code to run a first application on the device, the first application having an active status and corresponding to an instance of the HA service;
   code to maintain a second application in an inactive status at the device; and
   code to maintain a record of an HA activity state for each of the first and second applications, wherein a first entry in the record shows an active HA activity state corresponding to the instance of the HA service, and wherein a second entry in the record shows an inactive HA activity state for the HA service for the second application;
   code to receive service configuration information from a second processor-based device regarding the second application at the second processor-based device, wherein the second application has an active security status on the second processor-based device; and
   code to update service configuration information for the second application on the first processor-based device based on the receiving.

12. The computer program product of claim 11 in which the HA service comprises a security encryption protocol.

13. The computer program product of claim 11 further comprising: code to change the second application from an inactive status to an active status; and
   code to create another instance of the HA service for the second application.

14. The computer program product of claim 13 further comprising:
   code to update the second entry in response to the active status of the second application, the second entry showing an active HA activity state of the second application after updating.

15. The computer program product of claim 11 further comprising:
   code to send HA service configuration information for the first application to the second device within the cluster.

16. A method for providing security in a cluster of redundant processor-based devices, the method comprising:
   hosting a plurality of applications on a first processor-based device of the cluster, wherein a first application of the plurality is in an active state, and in which a second application of the plurality is in an inactive state;
   providing a secure communications service to the plurality of applications by a security service management application at the first processor-based device;
   recording a secure communications service status for the plurality of applications on an application-by-application basis, wherein a secure communications service status for the first application is active, and wherein the secure communications service status for the second application is inactive;
   receiving service configuration information from a second processor-based device regarding the second application at the second processor-based device, wherein the secure communications service status for the second application is active; and
   updating service configuration information for the second application on the first processor-based device based on the receiving.

17. The method of claim 16 in which providing a secure communications service comprises:
   applying a security association instance to the first application; and
   storing configuration information for a security association for the second application.

18. The method of claim 1, further comprising:
   sending service configuration information regarding the first application to a service-providing application on a second processor-based device, wherein the first application is in a standby mode on the second-processor-based device.

19. The method of claim 6, wherein the first processor-based device is operable to change the second application to an active status, and the service providing application is operable to provide the service to the second application based on stored service configuration information at the first processor-based device.

20. The system of claim 19 in which the service-providing application is operable to update the record of the second application to show an active service status in response to the change of the second application to the active status.

* * * * *